United States Patent

[11] 3,548,984

| [72] | Inventor | Robert S. Root<br>Syracuse, N.Y. |
|---|---|---|
| [21] | Appl. No. | 770,134 |
| [22] | Filed | Sept. 11, 1968 |
| [45] | Patented | Dec. 22, 1970 |
| [73] | Assignee | Lipe-Rollway Corporation<br>Syracuse, N.Y.<br>a corporation of New York |

[54] CLUTCH ANTI-RATTLE INNER PLATE
2 Claims, 3 Drawing Figs.

[52] U.S. Cl. .................................................. 192/70.17,
74/443
[51] Int. Cl. ................................................ F16d 13/68,
F16d 3/14
[50] Field of Search .......................................... 192/70.17,
70.2, 106.1; 74/443; 64/14

[56] References Cited
UNITED STATES PATENTS

| 1,977,368 | 10/1934 | Wood .......................... | 192/106.1 |
| 2,873,590 | 2/1959 | Croset ........................ | 64/14 |
| 3,162,284 | 12/1964 | Montgomery et al ......... | 192/70.2 |
| 3,345,831 | 10/1967 | Boole .......................... | 64/14 |
| 3,364,768 | 1/1968 | Powell ......................... | 74/443 |
| 3,438,221 | 4/1969 | Paulsen ....................... | 64/14 |

*Primary Examiner*—Allan D. Herrmann
*Attorneys*—Hancock, Ryan, Shove & Hust and John R. Varney ABSTRACT: An anti-rattle inner plate comprising a U-shaped strap of metal secured over the drive lugs of an inner drive plate of a friction type clutch, wherein each depending leg on the metal strap has a resilient material adhered thereto and with a metal plate covering the top of the resilient material for a wear surface, forming a shock absorber between the drive and driven members of the clutch.

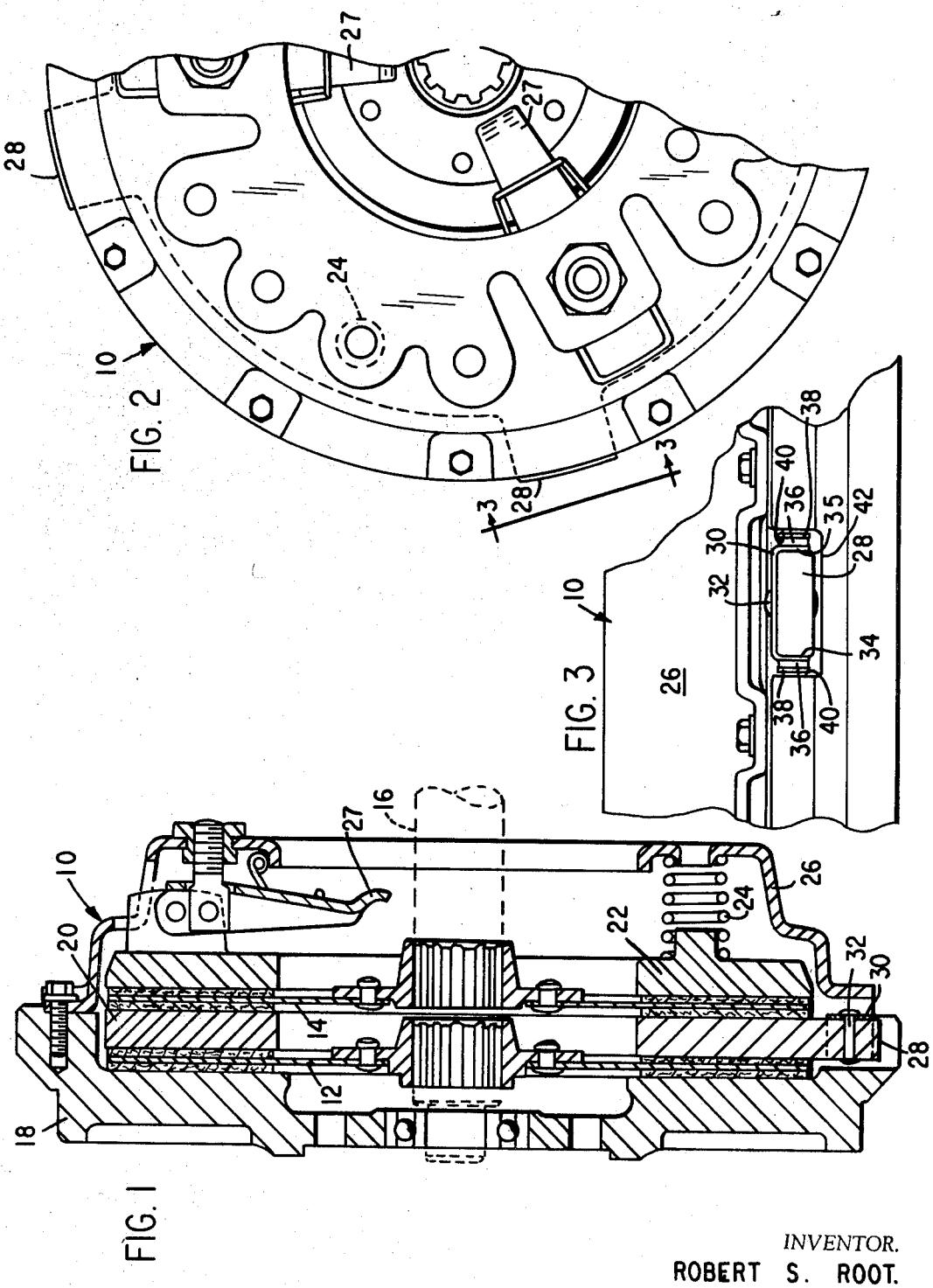

CLUTCH ANTI-RATTLE INNER PLATE

BACKGROUND OF INVENTION

In heavy truck type and construction vehicles driven with internal combustion engines, friction disc clutches are used to connect the engine with the running gears of these vehicles. With an internal combustion engine the torque or power is supplied therefrom in pulses, these pulses are very close together but never the less repeatedly in time they do some destructive damage to the mating parts, not to mention the noise generated therefrom.

To avoid the aforementioned noise and damage numerous devices have been devised, all of these have failed to solve the problems for they eliminated the free movement needed for separation, required special tools and equipment for installation which is sometimes impossible in the field.

SUMMARY OF THE INVENTION

In accordance with the preferred embodiment of this invention a shock absorbing device is provided which dampens engine pulses. An elastomer plastic is used in the center between two metal plates which are held between the drive lug and driven disc, of clutches commonly used in heavy duty vehicles. The metal plate against the lug may be common to both sides of the drive lug and interconnected by a web and formed into a U-shaped member to fit over the drive lug and be riveted thereto.

DESCRIPTION OF THE DRAWING

FIG. 1 is a sectional view of a double disc friction clutch;

FIG. 2 is a fragmentary plan view of the clutch shown in FIG. 1; and

FIG. 3 is a view taken on lines 3-3 of FIG. 2 showing the novel shock absorbing device secured to a drive lug.

DESCRIPTION OF THE PREFERRED EMBODIMENT

As shown in the drawing clutch 10 is a multiple plate friction type using two friction disc 12, 14 to drive an output shaft 16 shown in dashed lines. Friction disc 12 and 14 have friction facing material on both sides thereof, disc 12 has one side in contact with fly wheel 18 and the other side in contact with intermediate drive plate 20. Friction disc 14 is in contact with the opposite side of drive plate 20 and the pressure plate 22. Pressure plate 22 is spring loaded to the left as shown in the drawing and tends to compress both friction discs and drive plates into driven engagement with flywheel 18 and in turn drives output shaft 16. The pressure plate 22 is spring loaded by springs 24 which back up against the clutch cover 26. Also mounted in the housing 26 are clutch release levers 27, which when moved to the left in FIG. 1 disengage the drive shaft 16 and friction discs 12 and 14 from the flywheel 18, drive plate 20 and drive plate 22. Drive plate 20 has on its periphery a number of lugs 28 which engage notches in the flywheel 18. While the clutch is operating the torque pulses generated by an internal combustion engine are transmitted from the flywheel to the drive plate 20. With the clearance required between the lugs 28 and the mating notches on the flywheel 18 there is a slight amount of movement therebetween. This movement causes noise and vibration of which if allowed to continue, will cause some damage and the destruction of the clutch.

As seen in FIG. 3 lug 28 of the drive disc 20 has a U-shaped member 30 fitting over it and secured thereto by a rivet 32. On each depending leg 34, 35 of member 30 there is a resilient material 36 adhered thereto, and having a metal covering 38. This construction creates in effect, a sandwich of two pieces of metal with the resilient material therebetween. When surface 40 of notch 42 in the flywheel 18 contacts the metal covering 38 the shock thereof is transferred into the resilient material 36 and is thereby absorbed. The material 36 is preferably an elastomer plastic suitably selected for its durability, firmness and its ability to absorb shock.

With the shock absorbing device of this invention the clearance may be maintained between the lugs 28 and the flywheel 18, the torque pulses are now absorbed by the resilience of the elastomer plastic and the shock and noise eliminated.

I claim:

1. A clutch antichatter device to absorb the torque pulses transmitted between the drive member and the driven member in disc clutches, the combination of a clutch having a driven friction disc, first and second drive plates positioned on opposite sides of the friction disc and in frictional contact therewith, one of said drive plates having a plurality of radial extending lugs extending beyond the circumference of said friction disc, said lugs engaging said drive member, and resilient means carried by said lugs for absorbing torque pulses between the drive member and one of said drive plates, said resilient means comprising a U-shaped member affixed to said drive lug, resilient material affixed to the legs of said U-shaped member and cover means affixed to the outer surfaces of said resilient material.

2. An antichatter device as in claim 1 wherein said resilient material for absorbing torque pulses is an elastomer plastic carried between contact surface of drive member and said drive plate.